United States Patent [19] [11] 3,909,478
Riess et al. [45] Sept. 30, 1975

[54] PLASTICIZED COPOLYMERS

[75] Inventors: Gerard Riess, Mulhouse Dornach, France; Jacques Periard, Fribourg, Switzerland; Albert Banderet, Strasbourg, France

[73] Assignee: Agence Nationale de Valorisation de la Recherche (ANVAR), France

[22] Filed: Nov. 13, 1973

[21] Appl. No.: 415,359

Related U.S. Application Data

[63] Continuation-in-part of Ser. No. 230,479, Feb. 29, 1972, abandoned, which is a continuation of Ser. No. 831,984, June 10, 1969, abandoned.

[30] Foreign Application Priority Data

June 11, 1968 France .............................. 68.154609

[52] U.S. Cl.... 260/31.4 R; 260/30.4 R; 260/30.6 R; 260/30.8 R; 260/31.6; 260/31.8 R; 260/33.2 R; 260/33.4 R; 260/33.6 UA; 260/829; 260/901
[51] Int. Cl.²... C08K 5/01; C08K 5/05; C08K 5/11; C08K 5/12
[58] Field of Search ..... 260/31.4 R, 31.8 R, 87.5 C, 260/30.8 R, 33.4 R

[56] References Cited
UNITED STATES PATENTS
3,050,785    8/1962    Cunningham ....................... 260/901
FOREIGN PATENTS OR APPLICATIONS
1,576,598    8/1969    France ............................... 260/31.6

OTHER PUBLICATIONS
Modern Plastics Encyclopedia 1967, Sept. 1966, Vol. 44, No. 1A, pp. 418–419, 428–429 & 438–439.
Stille, John K., Introduction to Polymer Chemistry, John Wiley & Sons, New York, 1962, pp. 60–61.

Primary Examiner—James H. Derrington
Attorney, Agent, or Firm—Littlepage, Quaintance, Murphy & Dobyns

[57] ABSTRACT

A composition comprising a copolymer of styrene with vinyl chloride or methyl methacrylate and a plasticizer which has the property of lowering the Tg of a homopolymer of one of the monomers but of not lowering the Tg of the homopolymer of the other monomer. The compositions are transparent and have a high resistance to impact, good hardness and improved elongation under impact.

2 Claims, No Drawings

PLASTICIZED COPOLYMERS

CROSS REFERENCE TO RELATED APPLICATIONS

This application is a continuation-in-part of copending application Ser. No. 230,479 filed Feb. 29, 1972, now abandoned which is a continuation of a prior application Ser. No. 831,984 filed June 10, 1969, which is abandoned.

DISCLOSURE

Copolymers of styrene and methyl methacrylate as well as copolymers of styrene and vinyl chloride exhibit a number of properties which are improved when these copolymers are combined with a plasticizer. It is known in the art to produce a plasticized copolymer wherein the plasticizer is compatible with and capable of plasticizing both the homopolymers of the monomers that give rise to the copolymer. However, the plasticized copolymers so produced suffer from one or more of the poor physical and mechanical properties such as lower impact strength, lower breaking strength, lower hardness, poor tensile strength, too high elongation under traction, too low a softening point, etc. In addition, styrene-butadiene or styrene-isoprene polymers suffer from instability in oxidizing conditions, for example air, with attendant deterioration in the physical and mechanical properties inconsistent performance, and low durability. For instance, the prior art discloses the use of dioctyl phthalate for plasticizing the copolymer of methylmethacrylate and styrene. The plasticizer, dioctyl phthalate, is compatible with polymethylmethacrylate as well as polystyrene. The plasticized copolymer so produced has too low a softening point, too low hardness, too high elongation under traction, and the products produced from the copolymer are too soft. Alternately, when a plasticizer which plasticizes either one or both of the homopolymers of a mixture is used, the product is opaque and suffers from the disadvantages already mentioned in connection with a common plasticizer for producing a copolymer.

Accordingly, it is an object of the present invention to provide an improved composition of matter substantially free of one or more of the disadvantages of prior compositions.

Another object is to provide an improved composition of matter which is transparent.

Yet another object is to provide an improved composition of matter having a high resistance to impact.

A still further object is to produce transparent, high impact resistant and tough moulded articles from compositions having the plasticized copolymers of the instant invention.

Another object is to provide copolymers of high impact strength, high hardness, improved tensile strength and elonagation.

Yet another object is to use a selective plasticizer which yields a plasticized copolymer having the attendant superior physical and mechanical properties, consistent performance and high durability.

The above and other objects are accomplished according to the present invention by providing a composition comprising a copolymer of a first and a second monomer. In the copolymer, the first monomer is styrene and the second monomer is vinyl chloride or methyl methacrylate. The composition also comprises a plasticizer having the property of lowering the glass transistion temperature, commonly referred to as Tg, of a homopolymer of one of the monomers but of not lowering the Tg of a homopolymer of the other monomer. The compositions of the present invention are transparent and have a high resistance to impact.

The copolymers useful in the present invention can be random, block, or graft copolymers. However, block copolymers are preferred because of the ease with which they can be synthesized, and graft copolymers are preferred too.

Copolymers of styrene and methyl methacrylate can be employed having widely varying percentages of the two monomers, however, the styrene generally comprises from 10 to 90, preferably comprises from 30 to 70, and ideally comprises from 39 to 43, weight percent based upon the combined weight of styrene and methyl methacrylate. The balance is preferably methylmethacrylate. The copolymers of styrene and methyl methacrylate can have widely varying molecular weights but generally have molecular weights above 20,000 and preferably have molecular weights between 50,000 and 500,000. Below a molecular weight of 20,000 the mechanical properties fall rapidly and hence result in products with poor performance.

Copolymers of styrene and vinyl chloride can be employed having widely varying percentages of the two monomers, however, the vinyl chloride generally comprises from 2 to 20 weight percent based upon the combined weights of styrene and vinyl chloride. The balance is preferably styrene. The copolymers of styrene and vinyl chloride can have widely varying molecular weights but generally have molecular weights above 20,000 and preferably have molecular weights between 50,000 and 500,000. Below a molecular weight of 20,000 the mechanical properties of the copolymer are poor and hence result in products with poor performance.

The plasticizers useful in the present invention are chosen because of their physical effect of lowering Tg of a homopolymer of one momoner but of not lowering Tg of a homopolymer of the other monomer. In preferred embodiments of the present invention, the plasticizer is present in an amount and of a type which will lower the Tg of one homopolymer by at least 25°C but will lower the Tg of the other homopolymer an amount less than 10°C. Of course, it is impossible for a plasticizer to lower the Tg of a homopolymer if the plasticizer is incompatible with that homopolymer. For that reason, a preferred class of plasticizers are those which are incompatible with homopolymers of one monomer but are compatible with homopolymers of the other monomer. For example, when the copolymer consists essentially of styrene units and methyl methacrylate units, a plasticizer is chosen which is compatible with polystyrene and incompatible with polymethyl methacrylate. Alternatively, a plasticizer could be chosen which is compatible with polymethyl methacrylate and incompatible with polystyrene. The plasticizers useful in the present invention are chosen completely irrespective of their chemical compositions. In fact, the exact chemical compositions of many of the plasticizers useful in the present invention are trade secrets. Nevertheless, those skilled in the art can readily select plasticizers useful in the present invention by performing any simple test designed to determine compatibility. Alternatively, one can refer to the Modern Plastics Encyclopedia, 1967, Volume 44, No. 1A, pages 419–439, hereinafter referred to as the Plasticizers Chart. The Plasticizers Chart gives a list of plasticizers numbered 1 through 498 and indicates their compatibility with polystyrene, polymethyl methacrylate and polyvinyl chloride.

When the copolymer is one of styrene and methyl methacrylate, suitable plasticizers include those commercially available under the tradenames "Admex 760," "Santicizer 405," and "Santicizer 411," polyvinyl ether base polymeric plasticizers, mixed alkylene oxide polymers such as those of ethylene oxide and propylene oxide commercially available under the tradename "Pluronics," as well as certain polyester type plasticizers such as those commercially available under the tradenames "Harflex 300," "Harflex 325," and "Harflex 330." The preferred plasticizers for styrene-methyl methacrylate copolymers are diisobutyl azelate and butoxyethyl stearate. Other suitable plasticizers of general interest are denominated in the Plasticizers Chart by numbers 1, 35, 357, 384, 397, 398, 401, 412, 413, 426, 427, and 494.

When the copolymer is one of styrene and vinyl chloride, suitable plasticizers include polyesters such as those commercially available under the tradenames "Garbeflex HM 10" supplied by Société Melle-Bezons in France, "Paraplex G 53" supplied by Société Lambert-Riviere, "Flexol 2H" supplied by Union Carbide, and coumarone-indene resins. The preferred plasticizers for copolymers of styrene and vinyl chloride are hydroabietic alcohol, diethylene glycol dipelargonate, polyesters such as those of sebacic acid with aliphatic diols or triols and N-ethyl-toluene sulfonamide in both the ortho and para forms. Other suitable plasticizers are given in the Plasticizer Chart numbers 1, 362, 364, 365, 366, 367, 369, 370, 380, 392, and 431. Plasticizers of general interest are 35, 66, 71, 72, 74, 81, 83, 95, 97, 98, 99, 100, 101, 102, 103, 108, 173, 179, 251, 265, 397, 398, 401, 402, and 490.

The plasticizer generally comprises from 5 to 95 weight percent and preferably 20 to 80 weight percent based on the weight of the monomer whose homopolymer it is capable of plasticizing.

The invention may be better understood by reference to the following non-limiting examples wherein all parts and percentages are by weight. The impact strengths given in these examples were determined by the Charpy method using compressionmolded test bars having an average cross-section of 0.12 square centimeters.

EXAMPLE 1

This example illustrates a composition of the present invention comprising a two-sequence styrene and methyl methacrylate copolymer termed "Copolymer 19." Copolymer 19 has an average molecular weight of 330,000, contains 61 percent methyl methacrylate and 39 percent styrene.

The compositions were produced by employing as a plasticizer the alkylene oxide adduct commercially available under the tradename "Pluronic PL 64." This plasticizer is compatible with polymethyl methacrylate but is incompatible with polystyrene. Copolymer 19 was intimately mixed at room temperature with the quantities of the plasticizer shown in Table I:

TABLE I

| % by weight of plasticizer ("Pluronic PL 64" to PMM) | Properties of the plasticized copolymer obtained | | | | Impact strength kg/cm² |
|---|---|---|---|---|---|
| | Vicat point °C | °Shore D hardness | Breaking strength kg/mm² | Elongation % | |
| 0 | 109 | 82 | 8.3 | 4 | 6.6 |
| 10 | 95 | 79 | 7.8 | 6 | 7.2 |
| 25 | 80 | 70 | 5.6 | 10 | 9.6 |
| 50 | 68 | 60 | 2.2 | 70 | 12 |
| 75 | 64 | 40 | 2.2 | 80 | 24 |
| 100 | 60 | 28 | 2.2 | 80 | |

The data shown in Table II is submitted for comparative purposes and relates to a mechanical mixture of quantities of polymethyl methacrylate and polystyrene corresponding to the same percentages available in Copolymer 19. The polymethyl methacrylate had a molecular weight of 210,000 whereas the polystyrene had a molecular weight of 100,000. The same plasticizer was employed.

TABLE II

| % by weight of plasticizer ("Pluronic PL 64" to PMM | Properties of the plasticized mixtures of homopolymers | | | | Impact strength kg/cm² |
|---|---|---|---|---|---|
| | Vicat point °C | °Shore D hardness | Breaking strength kg/mm² | Elongation % | |
| 0 | 108 | 82 | 2.8 | 9 | 4.8 |
| 10 | 90 | 73 | 2.2 | 9 | 5.4 |
| 25 | 89 | 59 | 1.6 | 5 | 5.4 |
| 50 | 82 | 58 | 1.9 | 6 | 6 |

By reference to Tables I and II, it can be seen that at any given level of plasticizer, the mechanical properties of the mixture of homopolymers are distinctly inferior to the properties of the plasticized copolymer. At any level of plasticizer, the hardness of the mixture of homopolymers is less, the breaking strength is less, and the impact resistance is less when compared with those of the copolymer. It is completely unexpected that the hardness, breaking strength, and impact strength could be improved by the substitution of a copolymer for a mixture of polymers. Furthermore, the mixture of homopolymers is opaque, whereas the plasticized copolymers are transparent or slightly iridescent.

Vicat Point is the softening temperature of a resin or mixtures of resin. It can be regarded as similar to the Tg in the case of homopolymers and of random copolymers; in block or graft copolymers there are two distinct phases and consequently two different Tg's, but only one Vicat Point which in most cases at a temperature within the range defined by the two Tg's. Vicat Point is measured according to standard Tests: ASTM D 1525-58T and ASTM standards on Plastics 406 (1958).

EXAMPLE 2

This example illustrates a composition of the present invention employing a 3-sequence copolymer of styrene and methyl methacrylate having an average molecular weight of 149,000 and containing 58 percent by weight methyl methacrylate units and 42 percent by weight styrene units.

The plasticizer employed in this example is dibutyl azelate commercially available under the tradename "Hallco 3880." This plasticizer is compatible with polystyrene. The results obtained are summarized in Table III:

TABLE III

| % by weight of plasticizer | Properties of the plasticized copolymers obtained | | | | Impact strength |
|---|---|---|---|---|---|
| ("HALLCO 3880") | Vicat Point °C | °Shore D hardness | Breaking strength kg/mm² | Elongation % | kg/cm² |
| 0 | 116 | 80 | 7.2 | 4 | 9 |
| 10 | 100 | 80 | 6.7 | 5 | 9 |
| 25 | 81 | 79 | 5.0 | 8 | 9 |
| 50 | 64 | 70 | 3.2 | 19 | 9 |
| 75 | 60 | 50 | 1.7 | 50 | 18 |
| 100 | 60 | 24 | 1.1 | | |

For comparative purposes, the physical properties of a mixture of corresponding homopolymers are compared. The polymethyl methacrylate had a molecular weight of 80,000 whereas the polystyrene had a molecular weight of 60,000. The results are given in Table IV:

TABLE IV

| % by weight of plasticizer | | | Impact strength |
|---|---|---|---|
| ("HALLCO 3880" to PS) | Vicat Point °C | °Shore D hardness | kg/cm² |
| 50 | 52.5 | 58 | 1.8 |

It can be noted from Tables III and IV that the products obtained by simple mixing have very low mechanical characteristics as a result of the lack of adherence between the two phases. In addition, these products are opaque and have therefore no actual practical value whatsoever. On the other hand, the copolymers obtained according to the invention, with three sequences and plasticized, provide transparent or slightly iridescent products.

EXAMPLE 3

This example illustrates a composition of the present invention wherein the copolymer is a block copolymer. The block copolymer contains a central sequence of polystyrene and terminal sequences of polymethyl methacrylate. The copolymer contains 59% methyl methacrylate and 41% styrene and has a molecular weight of 105,000 measured by osmotic pressure. The molecular weight of the central polystyrene sequence is 33,500. Pluronic PL64 was employed as a plasticizer. The results are summarized in Table V:

TABLE V

| % by weight of plasticizer | Properties of the plasticized copolymer obtained | | | |
|---|---|---|---|---|
| ("HALLCO 3880" to PS) | Vicat Point °C | °Shore D hardness | Breaking strength kg/mm² | Elongation % |
| 50% | 61 | 71 | 3.5 | 6 |
| 70% | 48 | 49 | 1.6 | 35 |

EXAMPLE 4

This example illustrates a composition of the present invention employing a random copolymer having 57 percent methyl methacrylate units and 43 percent styrene units. The copolymer has a molecular weight measured by osmotic pressure of 120,000. The selective plasticizer employed in this example is that commercially available under the tradename "Pluronic PL 64." The results are summarized in Table VII:

TABLE VII

| % by weight of plasticizer | Properties of the plasticized copolymer obtained | | | | Impact strength |
|---|---|---|---|---|---|
| (Pluronic PL 64" to PMM) | Vicat point °C | °Shore D hardness | Breaking strength kg/mm² | Elongation % | kg/cm² |
| 0 | 88 | 76 | 4.5 | 4 | 8.4 |
| 10 | 69 | 76 | 4.5 | 4 | 9 |
| 25 | 61 | 74 | 4.5 | 5 | 10.8 |
| 50 | 58 | 63 | 3.1 | 45 | >30 |
| 75 | 55 | 47 | 1.8 | 110 | >30 |

EXAMPLE 5

This example relates to selective plasticizing of polystyrene-polyvinyl chloride graft copolymer. The selective plastizing is according to the invention made on the dispersed phase i.e. PVC phase in this case. The polymers thus obtained are impact resistant.

The starting material is a graft copolymer obtained in disactivating a 145,000 molecular weight anionic polystyrene through a 72,000 molelcular weight polyvinyl chloride.

Upon fractional precipitation it is found that the graft polymer consists of 91% styrene and 9% vinyl chloride.

It must be noted that similar graft copolymers may be obtained by cationic grafting.

The PVC phase further contains a stabilizing mixture:

1 portion epoxy derivative (stabilisant E 10: sold by Société Chevassus France),
2 portions alkyl tin derivatives (stabilisant E 61: sold by Société Chevassus France).

In the PVC phase selective plasticizing, use is made of a polymer plasticizer consisting in a sebacic acid based polymer available on the market under the name "Garbeflex HM 10."

The values of the impact resistance are measured on articles obtained by moulding the polymers at a temperature of 160°–165°C.

The results obtained are reported in Table VIII with respect to various plasticizing rate values:

TABLE VIII

| plasticizing rate based on copolymer's PVC | °Shore D hardness | Impact resistance kg/cm² |
|---|---|---|
| 50% | 74 | 3 |
| 100% | 70.2 | 6.6 |
| 200% | — | 5.4 |

EXAMPLE 6

This example is illustrative of the present invention for producing a plasticized copolymer of vinyl chloride and styrene. But using the same reactants and same proportions of reactants as those of Example 5 except that the plasticizer Garbeflex HM10 is replaced by N-ethyl-toluene sulfonamide (commercially available under the tradname Santicizere 8 of the Monsanto Chemical Co.) the results presented in Table X are obtained:

TABLE X

| plasticizing rate based on copolymer's PVC | °Shore D hardness | Impact resistance kg/cm² |
|---|---|---|
| 50 | 65.5 | 3.5 |
| 100 | 59 | 6.3 |

EXAMPLE 7

This example is a comparative example. The copolymer 19 of Example 1 is used for plasticizing with 50% (based on copolymer's methyl methacrylate) of a plasticizer, namely dioctyl phthalate, which plasticizes both the homopolymers of styrene and methyl methacrylate. The following properties are obtained on the plasticized copolymer:

Vicat Point 44°C
Shore D Hardness 30
Breaking Strength 3.7 kg/mm²
Elongation 40%
Impact Strength--could not be determined because the product was too soft.

Thus, it can be inferred by comparison of the above results with those of Table I of Example 1 that the product of Example 7 has poor mechanical properties.

For the purpose of comparison, a mixture of polystyrene- PVC homopolymers having a composition similar to that of said graft copolymer and having similar molecular features as the latter, give, by PVC phase selective plasticizing (plasticizing rate 100% with regard to PVC) a ligand whose impact resistance is 4.2 kg/cm².

Although the invention has been described in considerable detail with reference to certain preferred embodiments thereof, it will be understood that variations and modifications can be effected within the spirit and scope of the invention as described above and as defined in the appended claims.

What is claimed is:

1. A composition of matter comprising:

A. a copolymer of a first and a second monomer, wherein the first monomer is styrene and the second monomer is methyl methacrylate, wherein the methyl methacrylate comprises from 57 to 61 weight percent of the copolymer and the balance of the copolymer is styrene,
B. a plasticizer selected from the group consisting of diisobutyl azelate and butoxyethyl stearate.

2. A composition comprising:

A. a copolymer consisting of:
 1. 58 weight percent methyl methacrylate
 2. 42 weight percent styrene having a molecular weight of 149,000, and
B. dibutyl azelate present in an amount equal to 50 percent of the weight of styrene.

* * * * *